UNITED STATES PATENT OFFICE.

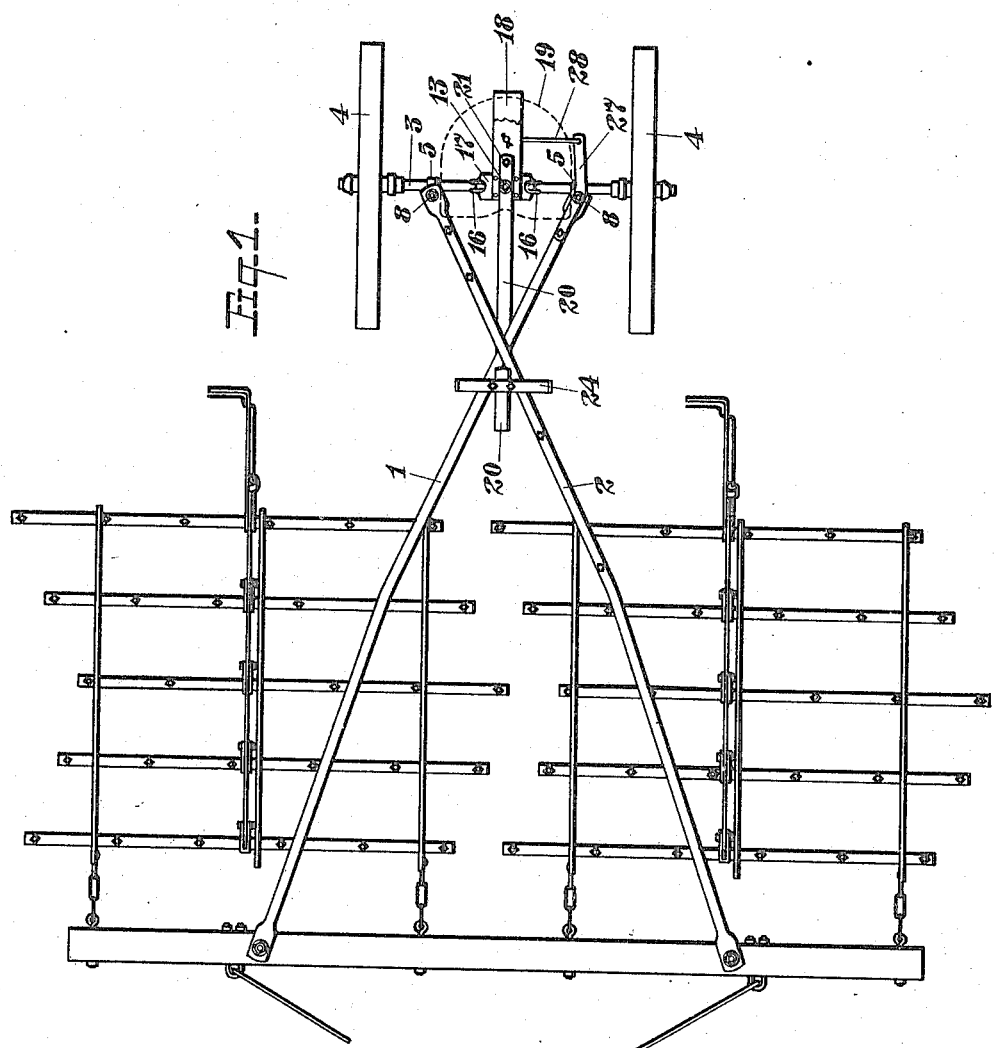

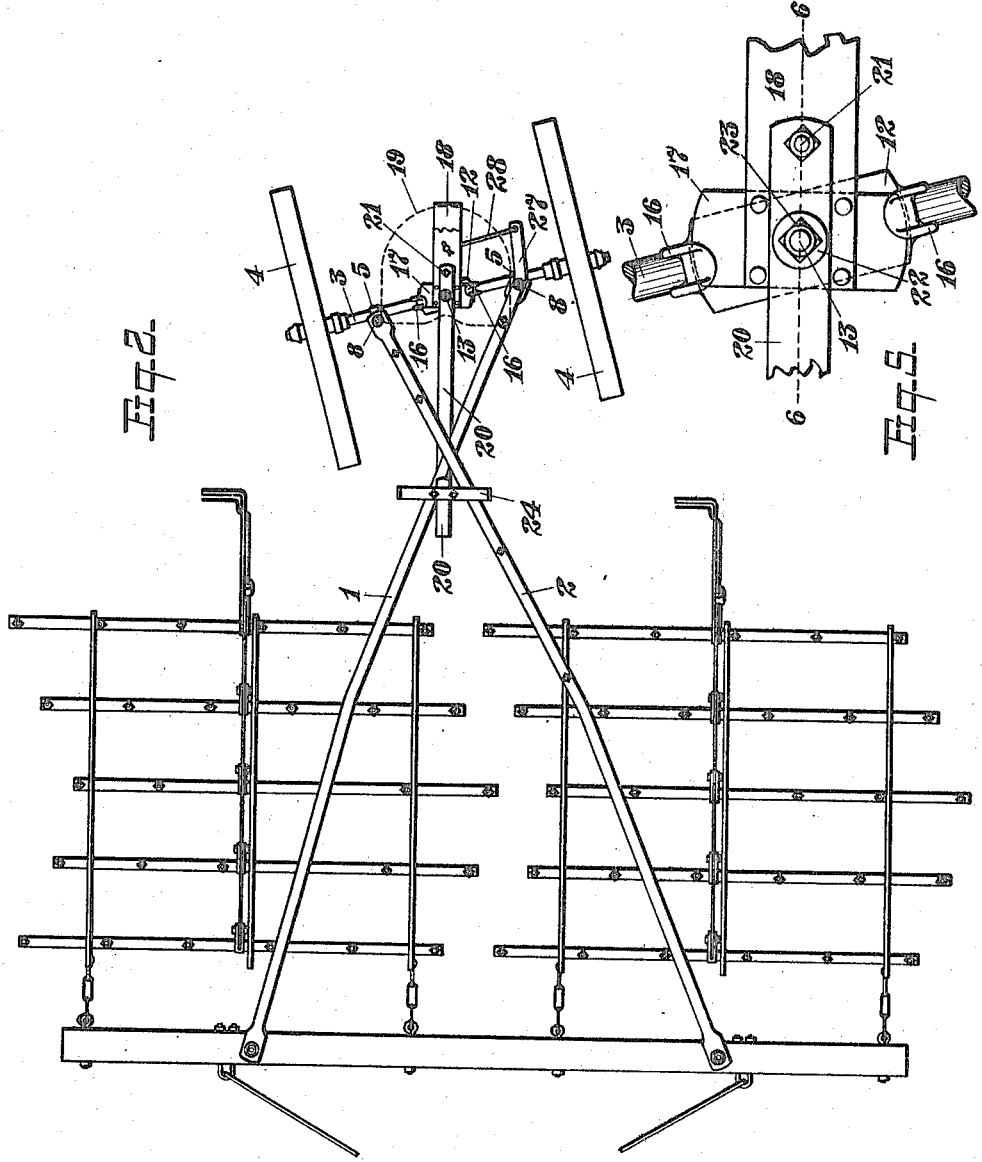

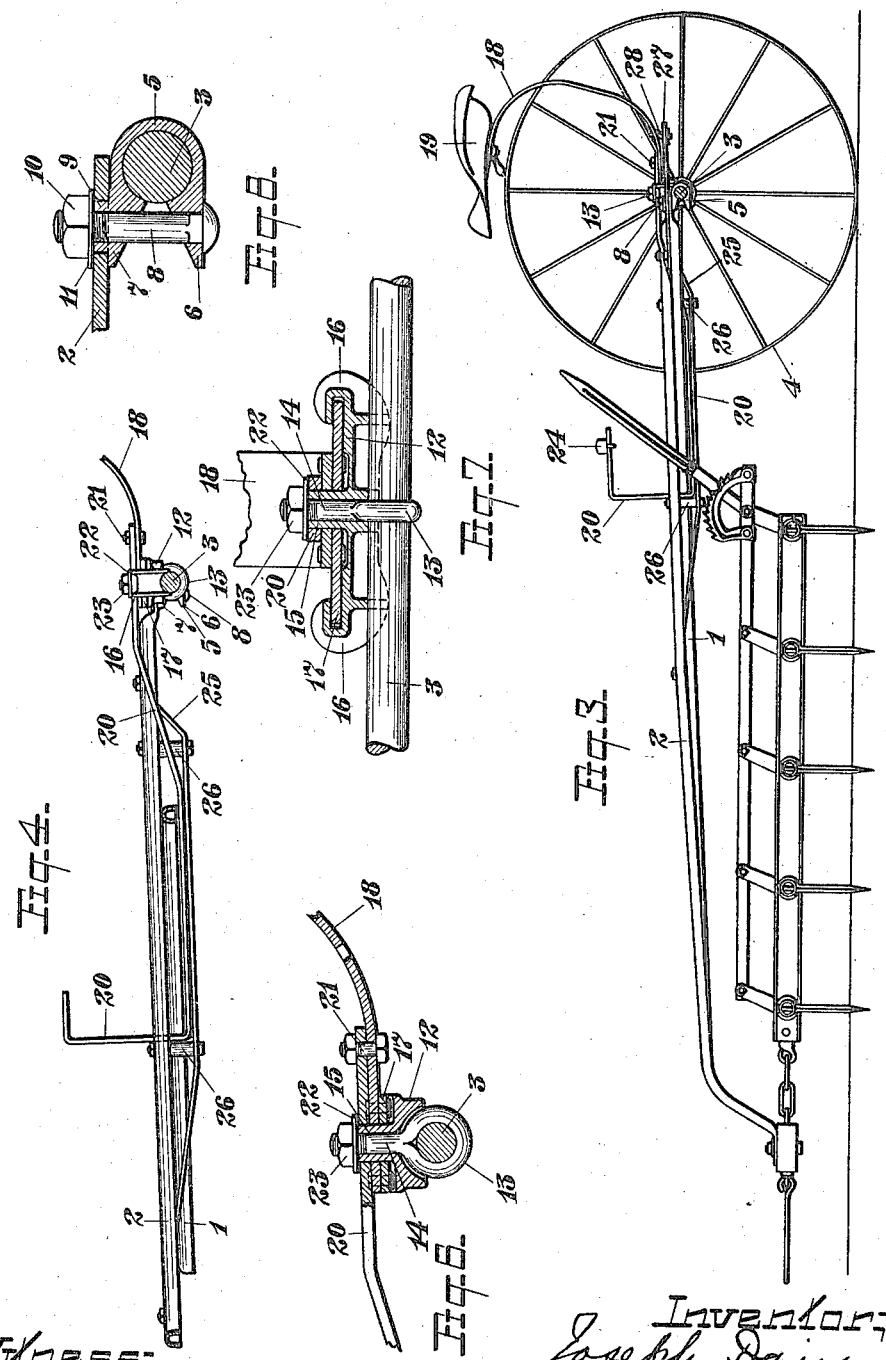

JOSEPH DAIN, OF MOLINE, ILLINOIS, ASSIGNOR TO DEERE AND COMPANY, OF MOLINE, ILLINOIS, A CORPORATION OF ILLINOIS.

RIDING ATTACHMENT FOR HARROWS.

1,221,148.  Specification of Letters Patent.  Patented Apr. 3, 1917.

Application filed August 4, 1916.  Serial No. 113,104.

*To all whom it may concern:*

Be it known that I, JOSEPH DAIN, a citizen of the United States, residing at Moline, in the county of Rock Island and State of Illinois, have invented certain new and useful Improvements in Riding Attachments for Harrows, of which the following is a specification, reference being had therein to the accompanying drawing.

My invention relates to riding attachments for harrows and other agricultural devices of a similar character, and the object of my invention is to provide a riding attachment flexibly connected to a harrow in such a manner that the driver will always face the harrow when the latter is drawn to change the direction of travel, or if the riding attachment should be swung laterally by contact of either or both wheels with an obstruction, and I accomplish this object by connecting one of the draft bars with the seat support in such a manner that their movement is simultaneous, as will be more fully hereinafter described.

Referring to the drawings in which similar numerals indicate identical parts—

Figure 1 is a plan view of my invention applied to a drag or toothed harrow.

Fig. 2 is a view similar to Fig. 1 with the seat removed and the wheels, axle and connected parts illustrated in position when the line of draft of the harrow is being changed, the seat being shown in dotted lines.

Fig. 3 is a side elevation of Fig. 1 with the nigh wheel removed.

Fig. 4 is an enlarged detail of the rear portion of the draft bars and foot rest support.

Fig. 5 is a detail plan illustrating the pivotal seat support.

Fig. 6 is a section on the line 6—6 of Fig. 5.

Fig. 7 is a transverse section of Fig. 6; and

Fig. 8 is an enlarged detail of the pivotal support of the draft bars on the axle.

I have shown, as adapted to the application of my device, a harrow of a well known type to the forward portion of which are pivotally connected draft bars 1 and 2 which cross rearward of the harrow and are pivotally connected to an axle 3 upon which are mounted wheels 4. The draft bars 1 and 2 are preferably of channel steel and are reversed to present the channel downward; the ends of the bars 1 and 2 are flattened, and perforated to admit the pivot bolts which secure the bars to the harrow and the axle 3. The bars 1 and 2 are secured to the axle 3, by clips 5, which clasp the axle 3, and have their ends 6 and 7 projecting forward of the axle and perforated to receive bolts 8; the ends 7 of the clips 5 have studs 9 preferably integral therewith, which extend into the perforations on the rear ends of the draft bars 1 and 2; the clips 5 are securely clamped on the axle by the bolts 8 which pass through the perforations in the ends 6 and 7 of the clips and through the studs 9 where they are rigidly held by nuts 10, washers 11 being interposed between the nuts 10 and the studs 9.

Central on the axle 3 is a saddle 12 held rigidly on the axle by an eye bolt 13, through the eye of which the axle 3 passes. The shank 14 of the eye bolt 13 extends upward through a sleeve 15 preferably integral with the saddle 12. The ends 16 of the saddle 12 are turned upward and inward over a plate 17 which is supported on the saddle 12 by the sleeve 15. A seat support 18 is riveted to the plate 17, and is perforated to fit over the sleeve 15; a seat 19 is mounted on the free end of the support 18. A forwardly extending bar 20 is rigidly secured to the seat support 18, rearward of the axle 3, by a bolt 21, and has a perforation through which the sleeve 15 extends. When the parts just described are assembled, a washer 22 is placed upon the shank 14 of the eye bolt 13 and over the bar 20 and the end of the sleeve 15, and a nut 23 on the threaded end of the shank 14 holds the parts named securely together. The bar 20 extends forwardly beneath the draft bars 1 and 2, and is bent upward, forward of the crossing of the latter, and then rearward to form a support for a foot rest 24 which is secured thereon in any suitable manner.

On the under side of the draft bar 2 is a bar 25 having its extremities extended into the channel of the draft bar 2 and there secured by suitable bolts or rivets. The central portion of the bar 25 is spaced from the draft bar by sleeves 26 placed vertically therebetween and secured in place by bolts which extend therethrough and through the bar 25 and draft bar 2 as shown. The draft bar 1 crosses the draft bar 2 beneath the latter and extends between the bar 25 and the draft bar 2 and the sleeves 26, the space therebetween acting as a guideway, so that while the draft bars 1 and 2 move freely longitudinally when the harrow is being turned, the vertical play thereof is limited by the bar 25.

On the rear end of the draft bar 1 is secured an arm 27 which extends rearward of the axle 3, and approximately parallel with the bar 20 and seat support 18; a link 28 is pivotally connected to the rear end of the arm 27, and to the seat support 18, and substantially parallel with the axle 3.

As shown in Fig. 2 the harrow is supposed to be turning to the right, drawing on the draft bar 2 and forcing the draft bar 1 rearwardly, angling the axle 3 and wheels 4 to follow the turning movement; the seat support 18 is however retained in its normal position of parallelism with the direct line of draft of the implement by reason of the link 28 connected to the seat support 18 and the arm 27, so that the operator on the seat 19 is in a position facing the harrow, a position which is maintained whether the turn of the harrow be to the right or left.

What I claim is—

1. A riding attachment for harrows comprising in combination, an axle having supporting wheels, means to connect the harrow and axle and to swing the axle at an angle to the harrow when the latter is turned, a seat pivotally supported on the axle, and means extending rearward of the axle and connected with the seat support to retain the latter in a parallel relation with the line of draft.

2. A riding attachment for harrows comprising in combination, an axle having supporting wheels, crossed draft bars pivotally connected to the harrow and axle and adapted to swing the axle at an angle to the harrow when the latter is turned, a seat pivotally supported on the axle, and means extending rearwardly of the axle and connected to one of said cross bars and the seat support to retain the latter in a parallel relation with the line of draft.

3. A riding attachment for harrows, comprising in combination, an axle having supporting wheels, crossed draft bars pivotally connected to the harrow and axle and adapted to swing the axle at an angle to the harrow when the latter is turned, a seat pivotally supported on the axle, and a link connecting one of said cross bars with the seat support to retain the latter in a parallel relation with the line of draft.

4. A riding attachment for harrows comprising in combination, an axle having supporting wheels, crossed draft bars pivotally connected to the harrow and axle and adapted to swing the axle at an angle to the harrow when the latter is turned, a seat pivotally supported on the axle, an arm connected to one of said cross bars and extending rearward of the axle, and a link connected to said arm and the seat support to retain the latter in a parallel relation with the line of draft.

5. A riding attachment for harrows comprising in combination, an axle having supporting wheels, a seat pivotally supported on the axle, draft bars pivotally connected to the harrow and axle and adapted to swing the axle at an angle to the harrow when the latter is turned, and means connecting the seat support with one of said draft bars to retain the seat support in a parallel relation with the line of draft.

6. A riding attachment for harrows comprising in combination, an axle having supporting wheels, a seat pivotally supported on the axle, means to connect the harrow and axle to swing the axle at an angle to the harrow when the latter is turned, said means having a connection with the seat support to retain the latter in a parallel relation with the line of draft.

In testimony whereof I affix my signature, in presence of two witnesses.

JOSEPH DAIN.

Witnesses:
JESSIE SIMSEN,
W. G. DUFFIELD.

Copies of this patent may be obtained for five cents each, by addressing the "Commissioner of Patents, Washington, D. C."